United States Patent [19]
Suzuki et al.

[11] Patent Number: 6,136,905
[45] Date of Patent: Oct. 24, 2000

[54] L-LACTIC ACID POLYMER COMPOSITION, MOLDED PRODUCT AND FILM

[75] Inventors: Kazuhiko Suzuki; Takayuki Watanabe; Yasuhiro Kitahara; Masanobu Ajioka; Shuhei Ikado, all of Kanagawa-ken, Japan

[73] Assignee: Mitsui Chemicals, Inc., Japan

[21] Appl. No.: 08/996,477

[22] Filed: Dec. 22, 1997

Related U.S. Application Data

[62] Division of application No. 08/434,540, May 4, 1995, Pat. No. 5,763,513.

[30] Foreign Application Priority Data

May 19, 1994 [JP] Japan ................................. 6-105232

[51] Int. Cl.[7] ............................... C08K 5/10; C08K 5/11
[52] U.S. Cl. ................ 524/310; 264/328.1; 264/331.12; 264/523; 524/306; 524/311; 524/312; 525/415; 528/271; 528/354; 528/359; 528/361
[58] Field of Search ................................ 264/210.6, 235, 264/235.6, 328.1, 328.17, 346, 523, 540, 331.12; 524/306, 310, 311, 312; 525/415; 528/271, 354, 359, 361

[56] References Cited

U.S. PATENT DOCUMENTS

| | | |
|---|---|---|
| 4,622,244 | 11/1986 | Lapka et al. . |
| 5,076,983 | 12/1991 | Loomis et al. . |
| 5,340,646 | 8/1994 | Morita et al. . |
| 5,358,475 | 10/1994 | Mares et al. . |
| 5,389,447 | 2/1995 | Blume et al. . |
| 5,444,107 | 8/1995 | Ajioka et al. . |
| 5,444,113 | 8/1995 | Sinclair et al. . |
| 5,489,474 | 2/1996 | Shinoda et al. . |
| 5,525,646 | 6/1996 | Lundgren et al. . |

FOREIGN PATENT DOCUMENTS

| | | |
|---|---|---|
| 0523789 | 1/1993 | European Pat. Off. . |
| 3635679 | 5/1988 | Germany . |
| WO 92/04413 | 3/1992 | WIPO . |

OTHER PUBLICATIONS

Database WPI, Section Ch, Week 9418, Derwent Publications Ltd., London, GB; Class A23, AN 94–146902 & JP–A–06090628, Apr. 5, 1994 *abstract*.

Database WPI, Section Ch, Week 9409, Derwent Publications Ltd., London, GB; Class A23, AM 94–071624 & JP–A–06024501, Feb. 1, 1994 *abstract*.

*Primary Examiner*—Judy M. Reddick
*Attorney, Agent, or Firm*—Burns, Doane, Swecker & Mathis, L.L.P.

[57] ABSTRACT

A lactic acid polymer composition comprising formulating 100 parts by weight of a mixture consisting of 80–95% by weight of an L-lactic acid polymer having an L-lactic acid proportion of 75% or more and 5–20% by weight of a plasticizer selected from the group consisting of a polyhydric alcohol ester and a hydroxypolycarboxylic acid ester, 0.1–5 parts by weight of an anti-blocking agent having a $SiO_2$ content of 90% or more and an average particle size of 7–50 nm, and 0.1–2 parts by weight of a slip agent; a molded product and film obtained from the composition; and a preparation process of the same are disclosed. The molded product and film are excellent in processability, transparency, flexibility, anti-blocking property and slip, and can be degraded into harmless water and carbon dioxide under natural environment, when abandoned.

8 Claims, No Drawings

L-LACTIC ACID POLYMER COMPOSITION, MOLDED PRODUCT AND FILM

This application is a divisional of Application No. 08/434,540, filed May 4, 1995 now U.S. Pat. No. 5,768,513.

BACKGROUND OF THE INVENTION

1. Field of the Invention

The present invention relates to a L-lactic acid polymer composition, and a molded product and a film of the composition. More particularly, the invention relates to a molded product and film having excellent transparency and flexibility.

2. Description of the Related Art

Resins having excellent transparency and flexibility are generally prepared by addition of plasticizers or elastomers to these resins. Addition of the plasticizers, however, leads to bleeding of the plasticizers from molded articles and is liable to cause blocking of the molded articles. A process has also been known to use the plasticizers in combination with an inorganic material as a blocking inhibitor. However, the inorganic material tends to decrease transparency of the molded articles. Further, addition of the elastomers is effective for improving flexibility of the molded products. However, the elastomers are liable to make the molded articles opaque.

Resins such as non-rigid polyvinyl chloride and specific polyolefin have been known to have excellent transparency and flexibility. These resins, however, increase the amount of scrap on waste disposal. Additionally, these resins scarcely degrade in the natural environment and semipermanently remain under the ground even in the case of burial disposal. Further, abandoned plastics have led to problems of impairing the aesthetics of the enviroment and destructing the living environment of marine organisms.

On the other hand, a homopolymer of lactic acid, a copolymer of L-lactic acid with D,L-lactic acid and a copolymer of lactic acid with other hydroxycarboxylic acids (hereinafter referred to generally as L-lactic acid polymer) have been developed as polymers which are thermoplastic and biodegradable. These polymers can be completely biodegraded in an animal body within a few months to an year. These polymers initiate degradation within a few weeks under humid environment, for example, in the case of being left in soil or sea water and disappear in one to several years. Further, these plastics have been characterized in that decomposition products are lactic acid, carbon dioxide and water which are non-toxic for the human body.

Lactic acid which is used as a raw material of polylactic acid has been prepared by a fermentation process or chemical synthesis. L-lactic acid, in particular, has been manufactured in a large scale by the fermentation process and its price has been reduced. Additionally, L-lactic acid has a feature of providing high stiffness for the resulting polymer. Consequently, various uses of L-lactic acid polymer are now under development.

Molded products prepared by injection molding, extrusion, and blow molding and films of L-lactic acid polymer are excellent in stiffness. These products, however, have low flexibility and have been scarcely applied to uses which require flexibility. DE Pat. 3,635,679 has disclosed addition of acetyl tributyl citrate to a surgical monofilament of L-lactic acid polymer as a plasticizer for improving flexibility. The patent, however, has no description on a stretched film having transparency, flexibility or heat resistance. Further, the surgical monofilament having flexibility can be certainly prepared by the process of a patent. The process, however, cannot be generally applied to the production of common articles and films because of insufficient processability. That is, the process of the patent leads to blocking in the course of molding operation, extrusion is liable to become irregular and the resulting films are practically inferior because of a poor slipping property.

U.S. Pat. No. 5,076,983 has disclosed a film comprising 0.1–8% by weight of a lactide monomer as a plasticizer, When the polymer is cast on a drum to form a film in the process, lactide separates from the film depending upon the concentration of lactide, sticks on the roll surface and thus leads to contamination of the drum surface and irregular thickness of the resultant film. As a result, the amount of addition is limited and the film exhibits an elongation of 30–140% as the effect of addition, according to the description. When a polymer is used in the form of a film, properties generally required for the film are an elongation higher than the above range, wind-up property in the processing step and slipping property under conditions of use. The films obtained by the above processes are practically still inferior in view of these respects.

It has been known to add silica as an inorganic filler to a biodegradable polymer. Exemplary patents for adding such an additive to the biodegradable polymer include Japanese Laid-Open Patent HEI 5-70,696, Japanese Kohyo HEI 4-504731 and Japanese Kohyo HEI 5-508,669.

Japanese Laid-Open Patent HEI 5-70696 has disclosed that 10–40% by weight of calcium carbonate or hydrated magnesium silicate (talc) having an average particle size of 20 $\mu$m or less are added to biodegradable plastics such as a 3-hydroxybutyrate/3-hydroxypivalate copolymer, polycaprolactone and polylactic acid in the preparation of a raw material of plastic containers, and the object is to accelerate decomposition of the biodegradable plastics after waste disposal by addition of a large amount of inorganic fillers.

Japanese Kohyo HEI 4-504731 (WO 90/01521) has described that properties such as hardness, strength and temperature resistance can be varied by addition inorganic fillers such as silica and kaolinite to a thermoplastic lactide plastic. Japanese Kohyo HEI 5-508,669 (WO 92/01737) has disclosed the addition of calcium silicate or talc as a processing aid to polylactic acid when it is used as a biodegradable foam material. The processing aid is used as a nucleating agent in the foaming extrusion process. However, any of these cases does not improve anti-blocking properties between the films.

SUMMARY OF THE INVENTION

The object of the invention is to solve the above problems and to provide an L-lactic acid polymer composition and a molded product and a film of the composition having improved transparency, flexibility, processability and slip.

As a result of an intensive investigation in order to accomplish the above object, the present inventors have completed the invention.

That is, one aspect of the invention is an L-lactic acid polymer composition comprising formulating 100 parts by weight of a mixture consisting of 80–95% by weight of L-lactic acid polymer having an L-lactic acid proportion of 75% or more and 5–20% by weight of a plasticizer selected from the group consisting of a polyhydric alcohol ester and a hydroxypolycarboxylic acid ester, 0.1–5 parts by weight of an anti-blocking agent having a $SiO_2$ content of 90% or more and an average particle size of 7–50 nm, and 0.1–2 parts by weight of a slip agent.

The molded product and film of the invention decompose, when abandoned, into harmless water and carbon dioxide within a relatively short period in the natural environment.

DETAILED DESCRIPTION OF PREFERRED EMBODIMENTS

A L-lactic acid polymer of the invention comprises a homopolymer of L-lactic acid, a copolymer of lactic acid and a hydroxycarboxylic acid, and a mixture of these compounds.

Lactic acids and hydroxycarboxylic acids are used as the raw material of these polymers.

Lactic acids which can be used are L-lactic acid, D-lactic acid, D, L-lactic acid, a mixture of these compounds, and lactide which is a cyclic dimer of lactic acid. Lactic acid raw materials can be used in various combinations so as to obtain a L-lactic acid proportion of 75 % or more in the resultant L-lactic acid polymer.

Exemplary hydroxycarboxylic acids which can be used in combination with lactic acids include glycolic acid, 3-hydroxybutyric acid, 4-hydroxybutyric acid, 4-hydroxyvaleric acid, 5-hydroxyvaleric acid, 6-hydroxycaproic acid, and cyclic ester intermediates of the hydroxycarboxylic acids, for example, glycolide which is a dimer of glycolic acid and $\epsilon$-caprolactone which is a cyclic ester of 6-hydroxycaproic acid.

The mixture of lactic acids and hydroxycarboxylic acids as the raw materials can be used in various combinations which provide an L-lactic acid content of 75% or more in the polymer obtained.

L-lactic acid polymer can be prepared by conducting direct dehydrating polycondensation on the above raw materials, or by conducting ring-opening polymerization on the cyclic dimers of the above lactic acids or hydroxycarboxylic acids, for example, lactide or glycolide, or on the cyclic ester intermediates such as $\epsilon$-caprolactone.

When the direct dehydration polycondensation is carried out in the preparation, the raw materials, that is, lactic acids or a mixture of lactic acids and hydroxycarboxylic acids are subjected to an azeotropic dehydration condensation preferably in the presence of a solvent, a phenyl ether-based solvent in particular, more preferably while removing water from the azeotropically distilled solvent and returning the substantially anhydrous solvent to the reaction system. Such process can provide a high molecular weight L-lactic acid polymer having a suitable strength for the invention.

L-lactic acid polymer has preferably a higher molecular weight so long as the polymer can be processed. The range of the molecular weight is more preferably 30,000–5,000,000. When a molecular weight is less than 30,000, a molded product reduces strength and is unsuitable for practical use. On the other hand, a molecular weight of more than 5,000,000 leads to inferior processability.

Exemplary plasticizers which can be used for the invention include hydroxypolycarboxylic acid esters such as acetyl tributyl citrate and polyhydric alcohol esters such as glycerol triacetate and glycerol tripropionate. The proportion of the plasticizer to L-lactic acid polymer is 20–5% by weight, preferably 15–9% by weight of the plasticizer for 80–95% by weight of L-lactic acid polymer. An amount of the plasticizer, less than 5% by weight has little effect on providing flexibility for the molded product and film. On the other hand, an amount exceeding 20% by weight leads to inferior anti-blocking property.

The anti-blocking agent of the invention requires $SiO_2$ in an amount of 90% or more, preferably 95% or more in order to make the molded product or films transparent in the forming and stretching steps. The anti-blocking agent preferably has an average particle size of 7–50 nm, and $SiO_2$ is more preferably anhydrous silica. The amount for use is 0.1–5 parts by weight, preferably 0.1–2 parts by weight for 100 parts by weight of a mixture of L-lactic acid polymer and the plasticizer.

When the amount is less than 0.1 part by weight, the anti-blocking effect cannot be found. On the other hand, an amount exceeding 5 parts by weight leads to inferior appearance of the molded product, transparency in particular.

When the particle size is less than 7 nm, particles are liable to coagulate and workability becomes poor. On the other hand, when the particle size exceeds 50 nm and is several $\mu$m in particular, fine irregularity emerges on the surface of the molded article and film and appearance of these products become opaque.

No particular restriction is imposed upon the slip agent of the invention. Preferred slip agent is an aliphatic amide having 17–22 carbon atoms. Particularly preferred slip agent is stearylamide and erucic amide.

The amount of the slip agent is 0.1–2 parts by weight for 100 parts by weight of the mixture of L-lactic acid polymer and a plasticizer. When the amount is less than 0.1 part by weight, no effect can be found on a slipping property of the film. When the amount exceeds 2 parts by weight, processability is inferior because forming operation becomes unstable.

It is required to limit the amount of the plasticizer, anti-blocking agent, and slip agent in the above range. The product obtained by using these additives in the above range has good processability, transparency, flexibility, anti-blocking property and slipping property.

Additionally, a molecular weight reduction of L-lactic acid polymer due to these additives is scarcely found in the processing step, and a whitening phenomenon (haze) caused by crystallization or solubility does not occur. Further, modifiers such as antioxidants and ultraviolet absorbers can also be added to the polymer of the invention.

Mixing of L-lactic acid polymer with the above plasticizer, anti-blocking agent and slip agent can be carried out by any known blending techniques.

A fine powder of L-lactic acid polymer having an average particle size of 15–100 $\mu$m is used in order to improve dispersion of the added plasticizer, anti-blocking agent and slip agent in the blending step and to exhibit the effect of these additives.

The L-lactic acid polymer composition of the invention can be granulated into pellets and bars, and used for the processing.

Next, the process for preparing the molded product, film and stretched film by using the L-lactic acid polymer composition of the invention will be illustrated in detail.

The molded product and film which are the object of the invention and obtained from the L-lactic acid polymer composition can be prepared by uniformly blending L-lactic acid polymer with the plasticizer, anti-blocking agent and slip agent in a mixer, pelletizing the resulting mixture, successively subjecting the pellets to injection molding, extruding, blow molding and further stretching when desired.

The products can be obtained, for example, by the following procedures. L-lactic acid polymer having an average particle size of 15–100 $\mu$m is mixed with a plasticizer, anti-blocking agent and slip agent in a ribbon blender. The composition thus obtained is successively extruded into pellets with an extruder having a barrel diameter of 36 mm and twin screws rotating in the same direction, at a cylinder temperature of 150–230° C. and a screw rotation of 100 rpm. Pellets of the invention are heat treated at 40–65° C. for about 2–10 hours. The treatment accelerates crystallization of the polymer in the pellets, improves heat resistance, prevents fusion bonding of the pellets, and thus improves extrusion stability.

When extrusion processing is carried out, a cylinder temperature of the extruder is set at 150–230° C. and a specific die is mounted at the top of the cylinder. Thus, inflation, sheet forming and pipe extrusion can be carried out. When injection molding and blow molding are carried out, a common extruder can be used by melting the pellets at a cylinder temperature of 150–230° C. and setting a mold temperature at 10–30° C.

A film which is obtained by extrusion such as inflation and sheet forming and has a thickness of 0.1–0.3 mm can be used for the preparation of a stretched film. A shrink, stretched film having a heat shrinkage of 10–45% at 120° C. and a non-shrink, stretched film having a heat shrinkage of less than 1% can be prepared by the following processes in the invention.

1. Preparation Process of the Shrink, Stretched Film

1) A transparent L-lactic acid polymer film having a thickness of 0.1–0.3 mm is prepared by the above extrusion. When a non-transparent film is used, it is difficult to obtain a stretched film of the invention.

2) The film obtained in 1) is uniaxially stretched or biaxially stretched. The stretching temperature is 35–60° C., preferably 40–50° C. and the stretch ratio is 1.5–4 times preferably 2–3 times. The preferred stretching velocity is 2–100 mm/sec.

3) Thermal setting of the stretched film obtained above is carried out at the stretching temperature in the range of 35–60° C. preferably 40–50° C. The heat setting time is in the range of 1–30 minutes.

The film thus obtained is excellent in processability, transparency, flexibility, anti-blocking property, and slipping property.

2. Preparation Process of the Non-shrink, Stretched Film

The non-shrink, stretched film can be prepared by carrying out heat setting at 120–130° C. after stretching the film in the above preparation process of the shrink, stretched film.

The film thus obtained is excellent in processability, transparency, flexibility, anti-blocking property and slipping property, and additionally has heat resistance.

Excellent flexibility of the product obtained in the invention can be seen in increased elongation. The stretched film without plasticizer has an elongation of 90%. On the other hand, the stretched film derived from the L-lactic acid polymer composition of the invention has an elongation of 150–180% which is about twice better than that of the stretched film without a plasticizer.

The composition of the invention comprises a slip agent and thus the resulting molded product and unstretched film are essentially good in slipping property. The slipping property is further improved by stretching the film. In other words, on preparing the stretched film, the amount of the slip agent can be greatly reduced as compared with a usual amount used for resins. Consequently, instability in processing and haze of film which are caused by addition of a large amount of the slip agent can be inhibited.

The composition of the invention has good processability and can be efficiently processed with a molding machine used for general purpose resins such as polypropylene resin. The molded products and films obtained from the composition have excellent transparency, flexibility, anti-blocking property and slipping property, and are suitably used for containers of cosmetics, daily necessaries and groceries, bottles, sheets, films, laminates and packaging materials. When these articles are disposed as waste and buried under the ground or abandoned into the sea or a river, they can be biodegraded like natural materials such as paper and wood into harmless water and carbon dioxide in the natural environment within a relatively short period.

EXAMPLES

The present invention will now be illustrated in detail by way of examples and comparative examples.

In these examples, part means part by weight.

[Preparation of L-lactic acid polymer]

L-lactic acid polymer used in the invention was prepared by the below described processes.

The weight average molecular weight Mw of the polymer was measured by gel-permeation chromatography under the following conditions using polystyrene as the reference.

Equipment: Shimadzu LC-10AD

Detector: Shimadzu RID-6A

Column: Hitachi Chemical GL-S350DT-5, and GL-S370DT-5

Solvent: chloroform

Concentration: 1%

Amount of charge: 20 μl

Flow date: 1.0 ml/min

Preparation Example 1

To a thick-walled cylindrical stainless steel polymerization reactor which was equipped with a stirrer, 100 parts of L-lactic, 0.01 part of stannous octoate and 0.03 part of dodecyl alcohol were charged, deaerated under vacuum for 2 hours and successively replaced by nitrogen gas. The mixture was heated in a nitrogen atmosphere with stirring at 200° C. for 3 hours. The interior of the reactor was gradually deaerated to the reduced pressure of 3 mmHg with a vacuum pump through a vent tube and a glass receiver while maintaining the same temperature. After an hour from the initiation of deaeration, distillation of the monomer and low molecular weight volatiles was ceased. The interior of the reactor was replaced by nitrogen gas. The polymer was discharged from the bottom of the reactor in the form of a strand and cut into pellets. L-lactic acid polymer A thus obtained had a weight average molecular weight Mw of about 100,000.

Preparation Example 2

To a 100 liter reactor equipped with a Dean-Stark trap 10 kg of 90% of L-lactic acid was charged and stirred at 150° C. for 3 hours under reduced pressure of 50 mmHg while distilling out water. Thereafter, 6.2 g of tin powder was added and oligomerization was carried out by stirring at 150° C. for 2 hours under reduced pressure of 30 mmHg. To the oligomer obtained, 28.8 g of tin powder and 21.1 kg of diphenyl ether were added and an azeotropic dehydration reaction was carried out at 150° C. under reduced pressure of 35 mmHg. The distilled water was separated from the solvent in the water separator and the solvent alone was returned to the reactor. After 2 hours, the organic solvent returning to the reactor was changed so as to enter into the reactor after passing through a column packed with 4.6 kg of molecular sieve 3A, and the reaction was carried out at 150° C. for 40 hours under reduced pressure of 35 mmHg. A solution of L-lactic acid polymer having an average molecular weight of 110,000 was obtained. The solution was diluted by adding 44 kg of dehydrated diphenyl ether and cooled to 40° C.

Separated crystals were filtered, washed three times with 10 kg of n-hexane, and dried at 60° C. under reduced pressure of 50 mmHg. To the powder thus obtained, 12 kg of 0.5 N hydrochloric acid and 12 kg of ethanol were added, stirred for an hour at 35° C., and filtered. The filter cake was dried at 60° C. under reduced pressure of 50 mmHg to obtain 6.1 kg (85% yield) of polymer powder. L-lactic acid polymer B thus obtained had an average particle size of 30 μm and a weight average molecular weight Mw of 110,000.

Preparation Example 3

The same procedures as in Preparation Example 2 were carried out except that 100 parts of DL-lactic acid was used in place of 100 parts of L-lactic acid.

L-lactic acid polymer C thus obtained had a weight average molecular weight Mw of about 110,000.

Preparation Example 4

The same procedures as in Preparation Example 2 were carried out except that 100 parts of L-lactic acid was replaced by 90 parts of L-lactic acid and 10 parts of glycolic acid as a hydroxycarboxylic acid ingredient. L-lactic acid polymer D thus obtained had a weight average molecular weight of about 100,000.

Preparation Example 5

The same procedures as described in Preparation Example 2 were carried out except that 100 parts of L-lactic acid was replaced by 80 parts of L-lactic acid and 20 parts of 6-hydroxycaproic acid as a hydroxycarboxylic acid ingredient. L-lactic acid polymer E thus obtained had a weight average molecular weight Mw of about 100,000.

Next, the stretched film of the L-lactic acid polymer in the invention was prepared by using L-lactic acid polymer obtained in Preparation Example 1–5.

Principal physical properties were measured under following conditions.

1) Haze:

Measured with a Haze Meter manufactured by Tokyo Denshoku Co. The measured value was converted to the Haze value of 300 μm in thickness.

2) Flexibility:

Measured in accordance with JIS-L 1096, Bending Resistance Test Method A (45 Degree Cantilever Method).

3) Heat Resistance:

A test specimen having dimensions of 100×100 mm was placed in an oven at 120° C. for an hour. Thereafter change in appearance and percentage of heat shrinkage were measured.

4) Anti-blocking Property:

Measured in accordance with JIS-Z 0219.

5) Slip:

Measured with a slip angle tester manufactured by Toyo Seiki Co. Two specimens were individually applied to the surfaces of the tilting plate and block having an weight of 1 kg. The block was put on the tilting plate so as to bring these specimens into contact with each other. Thereafter the plate was inclined from the horizontal state at a definite angular velocity of 2.7 degree/sec and the angle where the block started to slide was measured.

6) Degradability:

A specimen having dimensions of 2×5 cm was buried in the soil at 35° C. for 3 months under humidity of 30%. Thereafter appearance change and weight loss of the specimen were evaluated.

Examples 1–5

[Stretched film]

L-lactic acid polymer A–E which were respectively obtained in Preparation Examples 1–5 were used for preparing the compositions. Acetyl tributyl citrate (hereinafter referred to simply as ATBC) was used as a plasticizer. Anti-blocking agent used was Aerosil (manufactured by Nippon Aerosil Co.) comprising 99% or more $SiO_2$ and having an average particle size of 7 nm (Aerosil 300), 12 nm (Aerosil 200), 16 nm (Aerosil 130) and 40 nm (Aerosil 0X50), respectively. Newtron S (manufactured by Nippon Seiki Co.) was used as a slip agent.

L-lactic acid polymer A–E was individually mixed by using a ribbon blender with the plasticizer, anti-blocking agent and slip agent in an amount illustrated in Table 1.

Each composition thus obtained was pelletized with a twin screw extruder at a cylinder temperature of 170–210° C. The pellets were heat treated at 50° C. in an oven to accelerate crystallization. The pellets thus obtained were fused in an extruder at a cylinder temperature of 160–200° C., and delivered through a T-die mounted at the top of the extruder to obtain a film having a thickness of 0.13 mm.

The film thus obtained was biaxially stretched with a biaxial-stretching tester (manufactured by Iwamoto Seisakusho Co.) at a stretching temperature of 50° C., stretching velocity of 7 mm/sec and stretch ratio of 2.5 times. Further, the stretched film thus obtained was treated at a heat-setting temperature of 50° C. and heat-setting time of 5 minutes to obtain a heat-shrunk, stretched film having a thickness of 0.02 mm. Results are illustrated in Table 1.

Example 6

To 100 parts by weight of a mixture composed of 85% by weight of L-lactic acid polymer B obtained in Preparation Example 2 and 15% by weight of a plasticizer ATBC, 0.5 part by weight of an anti-blocking agent Aerosil 200 and 0.5 part by weight of a slip agent Newtron S were added and mixed in a ribbon blender. The mixture obtained was successively pelletized by the same procedures as carried out in Example 2 and extruded through a T-die to obtain a sheet having a thickness of 0.20 mm.

The film thus obtained was uniaxially stretched with the same stretching machine as used in Example 2 at a stretching temperature of 70° C., stretching velocity of 7 mm/sec, and stretch ratio of 2.5 times. Further, the stretched film thus obtained was treated at a heat-setting temperature of 70° C. and heat-setting time of 5 minutes to obtain a heat-shrunk, stretched film having a thickness of 0.08 mm.

The heat-shrunk, stretched film thus obtained had haze of 0.7%, heat-shrinkage of 30%, excellent anti-blocking property and slip of 16 degree.

Comparative Example 1

[Processability depending upon polymer composition]

Polylactic acid having an L-lactic acid proportion of 60% was obtained by mixing 20 parts by weight of L-lactic acid polymer B obtained in Preparation Example 2 and 80 parts by weight of L-lactic acid polymer C obtained in Preparation Example 3.

To 100 parts by weight of a mixture consisting of 85% by weight of the above obtained polylactic acid and 15% by weight of a plasticizer ATBC, 0.5 part by weight of an anti-blocking agent Aerosil 200 having an average particle size of 12 nm and 0.5 part by weight of a slip agent Newtron S were added as shown in Table 2 and pelletized by the same procedures as carried out in Example 1. Further, the pellets obtained were heat treated and processed into a film. Results are illustrated in Table 2.

Lactic acid polymer obtained above had a low L-lactic acid polymer proportion of 60% and was amorphous. Consequently, the heat treatment exerted no effect processability became unstable because of unstable supply of the resin in the extruder, and a film having a uniform thickness and width could not be obtained.

Comparative Examples 2–3

[Kind of plasticizer]

To 100 parts by weight of a mixture consisting of 85% by weight of L-lactic acid polymer B obtained in Preparation Example 2 and 15% by weight of a fatty acid ester-based plasticizer, ethyl stearate or an aliphatic dibasic acid ester-based plasticizer isodecyl adipate, 0.5 part by weight of anti-blocking agent Aerosil 200 and 0.5 part by weight of a slip agent Newtron S were added, mixed in a ribbon blender, and pelletized by the same procedures as described in Example 2.

Further, the pellets thus obtained were heat treated and processed into a film. When ethyl stearate was used as the plasticizer, the film had a haze of 60% and was fogged and inferior in transparency. When isodecyl adipate was used as the plasticizer, the film had a bending resistance of 15 mm and was not effective for improving flexibility.

Comparative Example 4

[Proportion of $SiO_2$ in anti-blocking agent]

A stretched film was prepared by carrying out the same procedures as described in Example 2 except that the amount of $SiO_2$ in the anti-blocking agent was changed to 60%.

The film obtained had a haze of 6% and transparency was poor.

Comparative Examples 5–7

[Property evaluation of stretched film without additive]

L-lactic acid polymer B obtained in Preparation Example 2, plasticizer ATBC, anti-blocking agent and slip agent were mixed in a proportion illustrated in Table 2 and stretched films were prepared by carrying out the same procedures as illustrated in Example 1. Results are shown in Table 2.

In Comparative Example 5, the polymer contained no plasticizer and thus the stretched film obtained was rigid.

In Comparative Example 6, the polymer contained no anti-blocking agent and thus the stretched film obtained had poor anti-blocking property.

In Comparative Example 7 the polymer contained no slip agent and thus the stretched film obtained had poor slip and was inferior in practicality.

Comparative Example 8

[Effect of particle size in anti-blocking agent]

A stretched film was prepared by carrying out the same procedures as described in Example 2 except that the anti-blocking agent having a particle size of 3 μm which was outside the range of 7–50 nm was used. Results are illustrated in Table 2. The stretched film obtained had inferior transparency.

Comparative Examples 9–10

[Effect of temperature in the heat treatment of pellet]

L-lactic acid polymer B obtained in Preparation Example 2, plasticizer ATBC, anti-blocking agent and slip agent were mixed with a ribbon blender in a proportion shown in Table 2 by carrying out the same procedures as described in Example 2.

The mixture obtained was pelletized with a twin screw extruder at a cylinder temperature of 170–210° C. The pellets thus obtained were heat treated at 35° C. or 70° C. which was outside the heat treatment range of 40–65° C. in the invention. The heat-treated pellets were successively extruded through a T-die into a sheet by carrying out the same procedures as described in Example 2. Results are illustrated in Table 2.

In Comparative Example 9, crystallization was insufficient in the heat treatment and thus the pellets were liable to stick to each other at the bottom of a hopper and to make extrusion unstable.

In Comparative Example 10, the plasticizer was liable to evaporate from the pellets and thus extrusion became unstable due to adhesion of vaporized plasticizer onto the pellet surface.

Example 7

[Heat-resistant, stretched film]

L-lactic acid polymer B obtained in Preparation Example 2, plasticizer ATBC, anti-blocking agent and slip agent were mixed in the proportions shown in Table 1. A sheet having a thickness of 0.13 mm was obtained by carrying out the same procedures as described in Example 1. The sheet had a slip of 22 degrees. The sheet was biaxially stretched with a biaxial-stretching tester under conditions of a stretching temperature of 50° C., stretching velocity of 7 mm/sec stretch ratio of 2.5 times. Further, the stretched film obtained was treated at a heat-setting temperature of 120° C. and heat-setting time of 5 minutes.

The stretched and heat-set film thus obtained had a thickness of 0.02 mm. Results are illustrated in Table 1. Further, the film had a good heat resistance because the films maintained transparency and exhibited heat shrinkage of 0.5% after heating test at 120° C.

Comparative Example 11

A stretched film was prepared by carrying out the same procedures as described in Example 1 except that polypropylene resin was used in place of L-lactic acid polymer A obtained in Example 1 and the cylinder temperature was 180–230° C. The stretched film thus obtained had poor degradability in soil and no change was observed after burying in the soil for 3 months.

Example 8

[Injection and injection blow molded product]

L-lactic acid polymer B obtained in Preparation Example 2, plasticizer ATBC anti-blocking agent Aerosil 200 having an average particle size of 12 nm and an $SiO_2$ proportion of 99% or more, and slip agent Newtron S were mixed with a ribbon blender in the proportions shown in Table 3. The mixture was successively pelletized with a twin screw extruder at a cylinder temperature of 170–210° C. The pellets obtained were heat treated in an oven at 50° C. and injection molded with an injection molding machine JSW-75 (manufactured by Japan Steel Works) at a cylinder temperature of 160–200° C. and mold temperature of 20° C. A plate having a thickness of 1 mm was obtained as an injection molded product. Results of evaluation on the injection molded product are illustrated in Table 3.

Physical properties of the injection molded product were measured by the following conditions.

1) Haze was measured at a thickness of 1 mm.
2) Flexibility was shown by the flexural modulus of the sheet.
3) Anti-blocking and slip properties were measured by the same method as in the case of the film.

Example 9

L-lactic acid polymer B obtained in Preparation Example 2, plasticizer ATBC, anti-blocking agent and slip agent were mixed in the proportion shown in Table 3. The mixture was pelletized and heat treated by carrying out the same procedures as described in Example 8. The heat treated pellets were blow molded with an IBA-model injection blow molding machine (manufactured by Nissei Plastic Industrial Co.) at a cylinder temperature of 160–200° C., core temperature of 40° C. and blowing-air pressure of 9 kg/cm$^2$ to obtain a hexagonal pillar shaped container having an internal volume of about 200 ml and wall thickness of about 1 mm. Evaluation results on the container are illustrated in Table 3. Flexural modulus was measured by cutting out a flat portion from the container.

Comparative Examples 12–13

[Molded product without plasticizer]

Preparation and heat treatment of pellets were carried out by the same procedures as described in Examples 8 and 9 except that the compositions of Examples 8 and 9 contain no plasticizer. Injection molding and injection blow molding were carried out by using the pellets thus obtained. Evaluation results on these molded products are illustrated in Table 3. These molded products were rigid and inferior in flexibility.

However, these examples are not intended to limit the scope of the present invention. The present invention may be practiced or embodied in still other ways without departing from the spirit or essential character thereof.

TABLE 1

Effect of Ingredients (film)

|  | Example 1 | Example 2 | Example 3 | Example 4 | Example 5 | Example 7 |
|---|---|---|---|---|---|---|
| Polymer composition (wt %) | A 90 | B 85 | B 40.5 C 40.5 | D 87 | B 46.5 B 46.5 | B 85 |
| L-lactic acid proportion (%) | 100 | 100 | 75 | 90 | 90 | 100 |
| Plasticizer (wt %) | ATBC 10 | ATBC 15 | ATBC 19 | ATBC 13 | ATBC 7 | ATBC 15 |
| Anti-blocking agent |  |  |  |  |  |  |
| Particle size |  |  |  |  |  |  |
| (nm) | 7 | 12 | 16 | 40 | 12 | 12 |
| (part) | 1 | 0.5 | 2 | 3 | 0.5 | 0.5 |
| Slip agent (part) | 1 | 0.5 | 1 | 2 | 1 | 0.5 |
| Heat treatment temperature (° C.) | 50 | 50 | 50 | 50 | 50 | 50 |
| Film extrusion | good | good | good | good | good | good |
| Thickness of stretched film (μm) | 20 | 20 | 20 | 20 | 20 | 20 |
| Appearance transparency | good | good | good | good | good | good |
| Haze (%/300 μm) | 0.5 | 0.5 | 0.6 | 0.5 | 0.5 | 0.5 |
| Bending resistance (mm) | 6 | 5 | 5 | 5 | 5 | 5 |
| Elongation (%) | 160 | 170 | 180 | 160 | 150 | 180 |
| Heat-shrinkage (%) | 25 | 25 | 26 | 25 | 23 | 0.5 |
| Anti-blocking property | good | good | good | good | good | good |
| Slip (°) | 14 | 15 | 14 | 14 | 14 | 12 |
| Soil degradation after 3 months |  | readily collapsed by external force |  |  |  |  |
| Weight loss (%) | 44 | 45 | 40 | 42 | 41 | 47 |

TABLE 2

Effect of Ingredients (film)

|  | Comp. Ex. 1 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|
| Polymer composition (wt %) | B 17 C 68 | B 100 | B 85 | B 85 | B 85 | B 85 | B 85 |
| L-lactic acid proportion (%) | 60 | 100 | 100 | 100 | 100 | 100 | 100 |
| Plasticizer (wt %) | ATBC 15 | — | ATBC 15 | ATBC 15 | ATBC 15 | ATBC 15 | ATBC 15 |

TABLE 2-continued

Effect of Ingredients (film)

|  | Comp. Ex. 1 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|
| Anti-blocking agent | | | | | | | |
| Particle size | | | | | | | |
| (nm) | 12 | 12 | — | 12 | 3 μm | 12 | 12 |
| (part) | 0.5 | 0.5 | — | 0.5 | 0.5 | 0.5 | 0.5 |
| Slip agent (part) | 0.5 | 0.5 | 0.5 | — | 0.5 | 0.5 | 0.5 |
| Heat treatment temperature (° C.) | 50 | 50 | 50 | 50 | 50 | 35 | 50 |
| Film extrusion | unstable | good | good | good | good | unstable | unstable |
| Thickness of stretched film (μm) | — | 20 | 20 | 20 | 20 | — | — |
| Appearance transparency | — | good | good | good | good | — | — |
| Haze (%/300 μm) | — | 0.5 | 0.5 | 0.5 | 15 | — | — |
| Bending resistance (mm) | — | 20 rigid | 5 | 5 | 5 | — | — |
| Elongation (%) | — | 90 | 180 | 180 | 170 | — | — |
| Heat-shrinkage (%) | — | 20 | 25 | 25 | 24 | — | — |
| Anti-blocking property | — | good | poor | good | good | — | — |
| Slip (°) | — | 13 | 20 | 29 poor | 14 | — | — |
| Soil degradation after 3 months | — | readily collapsed by external force | | | | — | — |
| Weight loss (%) | — | 40 | 43 | 43 | 44 | — | — |

TABLE 3

Properties of molded product

|  | Example 8 | Example 9 | Comparative Example 12 | Comparative Example 13 |
|---|---|---|---|---|
| Molding process | injection molding | injection blow molding | injection molding | injection blow molding |
| Polymer acid proportion (wt %) | B 85 | B 85 | B 100 | B 100 |
| L-lactic acid proportion (%) | 100 | 100 | 100 | 100 |
| Plasticizer (%) | ATBC 15 | ATBC 15 | — | — |
| Additives Anti-blocking agent | | | | |
| Particle size | | | | |
| (nm) | 12 | 12 | 12 | 12 |
| (part) | 0.5 | 0.5 | 0.5 | 0.5 |
| Slip agent (part) | 0.5 | 0.5 | 0.5 | 0.5 |
| Molding-ability | good | good | good | good |
| Thickness (mm) | 1 | 1 | 1 | 1 |
| Appearance · Transparency | good | good | good | good |
| Haze (%/1 mm) | 1.0 | 1.1 | 1.1 | 1.0 |
| Bending resistance (kg/cm²) | 4,000 | 4,100 | 15,000 rigid | 16,000 rigid |
| Anti-blocking property | good | good | good | good |
| Slip (°) | 19 | 18 | 15 | 14 |
| Soil degradation after 3 months | readily collapsed by external force | | | |
| Weight loss (%) | 17 | 17 | 14 | 15 |

What is claimed is:

1. An L-lactic acid polymer molded product prepared by heat treating at 40–65° C. and successive molding a L-lactic acid polymer composition comprising 100 parts by weight of a mixture consisting essentially of 80–95% by weight of an L-lactic acid polymer having an L-lactic acid proportion of 75% or more and 5–20% by weight of a plasticizer selected from the group consisting of a polyhydric alcohol ester and a hydroxypolycarboxylic acid ester wherein said percentages of L-lactic acid polymer and plasticizer are based on the total amount of L-lactic acid polymer and plasticizer, 0.1–5 parts by weight of an antiblocking agent having a $SiO_2$ content of 90% or more and an average particle size of 7–50 nm, and 0.1–2 parts by weight of a slip agent, the parts by weight of the antiblocking agent and the slip agent being based on 100 parts by weight of the mixture.

2. The L-lactic acid polymer molded product of claim 1 wherein the molded product has a haze of 4% or less for a product thickness of 1 mm.

3. The L-lactic acid polymer molded product of claim 1 wherein the molding is an injection molding or a blow molding.

4. The L-lactic acid polymer molded product of claim 1 wherein the molded product is a sheet.

5. An L-lactic acid polymer stretched film obtained by stretching the sheet of claim 4.

6. The L-lactic acid polymer stretched film of claim 5 wherein the stretched film has a haze of 2% or less for a film thickness of 300 μm.

7. An L-lactic acid polymer non-shrink stretched film which is prepared by further heat treating the stretched film of claim 5 at 120–130° C. and has a heat shrinkage of less than 1% at 120° C.

8. An L-lactic acid polymer shrink stretched film which is prepared by further heat treating the stretched film of claim 5 at 35–60° C. and has a heat shrinkage of 10–45% at 120° C.

* * * * *